(12) United States Patent  (10) Patent No.: US 8,550,671 B2
Yeh et al.  (45) Date of Patent: Oct. 8, 2013

(54) CLAMP STRUCTURE FOR FIXING A LIGHT BAR ON A BASE AND BACKLIGHT MODULE HAVING CLAMP STRUCTURE

(75) Inventors: Tien-Yu Yeh, New Taipei (TW); Ying-Te Kuo, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 198 days.

(21) Appl. No.: 13/270,234

(22) Filed: Oct. 11, 2011

(65) Prior Publication Data

US 2012/0195069 A1 Aug. 2, 2012

(30) Foreign Application Priority Data

Feb. 1, 2011 (TW) .............................. 100103800 A

(51) Int. Cl.
*F21V 21/00* (2006.01)
*F21V 21/08* (2006.01)

(52) U.S. Cl.
USPC ....... 362/396; 362/217.16; 362/457; 362/634

(58) Field of Classification Search
USPC ............... 362/217.1–217.17, 249.01–249.11, 362/382, 396, 457, 612, 632–634
See application file for complete search history.

(56) References Cited

U.S. PATENT DOCUMENTS 7,578,610 B2  8/2009  Sakamoto

FOREIGN PATENT DOCUMENTS

CN  101008746 A  8/2007
CN  101660729 A  3/2010

OTHER PUBLICATIONS

Office action mailed on May 17, 2013 for the China application No. 201110048708.0, p. 3 line 3-45 and p. 4 line 1-6.

*Primary Examiner* — Jason Moon Han
(74) *Attorney, Agent, or Firm* — Winston Hsu; Scott Margo

(57) ABSTRACT

A clamp structure includes a first board portion, a second board portion connected to a lateral side of the first board portion in an elastically deformable manner, and a third board portion connected to the other lateral side of the first board portion opposite to the second board portion in an elastically deformable manner. The third board portion and the second board portion are disposed on the same side of the first board portion for clamping two surfaces of a base, and the first board portion contacts against a light bar for fixing the light bar on the other surface of the base.

7 Claims, 5 Drawing Sheets

CLAMP STRUCTURE FOR FIXING A LIGHT BAR ON A BASE AND BACKLIGHT MODULE HAVING CLAMP STRUCTURE

BACKGROUND OF THE INVENTION

1. Field of the Invention

The present invention relates to a clamp structure, and more particularly, to a clamp structure for fixing a circuit board on a base and a backlight module having the clamp structure.

2. Description of the Prior Art

LEDs of a conventional edge type backlight module are disposed on a base for forming a light bar, and the light bar is fixed on a metal back plate or a thermal fin by screw or glue for dissipating heat generate by the light bar. Generally, the light bar is adhered on the back plate or on the thermal fin for the edge type backlight module applied on a small-size display module. It has advantages of low cost and convenient operation, however it also has a drawback that the light bar can not be reused once gluing on the back plate. Besides, the light bar can not be disposed on the metal back plate or on the thermal fin by the glue due to greater dimensions of the light bar for the edge type backlight module applied on a large-size display module, so that the light bar has to be fixed on the metal back plate or on the thermal fin by the screw instead. However, it has drawbacks of complicated assembly, wasting labor hour, and mechanical damage due to inappropriate locking operation. The light bar with thin thickness can not be fixed on the metal back plate or on the thermal fin by the screw for the thinner display module. Thus, design of a light bar assembly capable of reworking and preventing the light bar from being damaged is an important issue of the display industry.

SUMMARY OF THE INVENTION

The present invention provides a clamp structure for fixing a circuit board on a base and a backlight module having the clamp structure for solving above drawbacks.

According to an embodiment of the invention, a clamp structure includes a first board portion, a second board portion connected to a lateral side of the first board portion in an elastically deformable manner, and a third board portion connected to the other lateral side of the first board portion opposite to the second board portion in an elastically deformable manner. The third board portion and the second board portion are disposed on the same side of the first board portion for clamping two surfaces of a base, and the first board portion contacts against a light bar for fixing the light bar on the other surface of the base.

According to an embodiment of the invention, at least one hole is formed on the third board portion for decreasing planar rigidity of the third board portion.

According to an embodiment of the invention, the first board portion comprises a protruding portion for pressing the light bar on the other surface of the base, and the protruding portion, the second board portion and the third board portion are disposed on the same side of the first board portion.

According to an embodiment of the invention, the third board portion comprises at least one engaging portion disposed on a side of the third board portion facing to the second board portion for engaging inside a sunken part on the base.

According to an embodiment of the invention, the second board portion comprises at least one engaging portion disposed on a side of the second board portion facing to the third board portion for engaging inside the other sunken part on the base.

According to an embodiment of the invention, the first board portion, the second board portion and the third board portion are made of conductive material for grounding.

According to an embodiment of the invention, the base is a heat dissipating block or a frame made of heat conducting material, and the first board portion, the second board portion and the third board portion are made of heat conducting material for dissipating heat generated by the light bar.

According to an embodiment of the invention, a backlight module includes a base, a light guiding plate disposed nearby the base, a light bar disposed on a side of the light guiding plate, and a clamp structure for fixing the circuit board on the base. The light bar includes a printed circuit board disposed on the base, and at least one light emitting diode disposed on the printed circuit board for emitting light to the light guiding plate. The clamp structure includes a first board portion, a second board portion connected to a lateral side of the first board portion in an elastically deformable manner, and a third board portion connected to the other lateral side of the first board portion opposite to the second board portion in an elastically deformable manner. The third board portion and the second board portion are disposed on the same side of the first board portion for clamping two surfaces of a base, and the first board portion contacts against a light bar for fixing the light bar on the other surface of the base.

The clamp structure of the invention is a U-shaped structure, and utilizes the first board portion, the second board portion and the third board portion to constrain the vertical displacement and the horizontal displacement of the light bar relative to the base. The clamp structure of the invention can be made of the resilient material, so that the clamp structure can be pushed to assemble on the light bar and be pulled to disassemble from the light bar easily and conveniently. The invention has advantages of convenient assembly and easy operation, and the base is not damaged by the clamp structure when the clamp structure clamps the base, so as to increase rework quality of the backlight module. In addition, the clamp structure can fix the light bar on the base of the backlight module having different dimensions, so that the invention has great market competitiveness.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
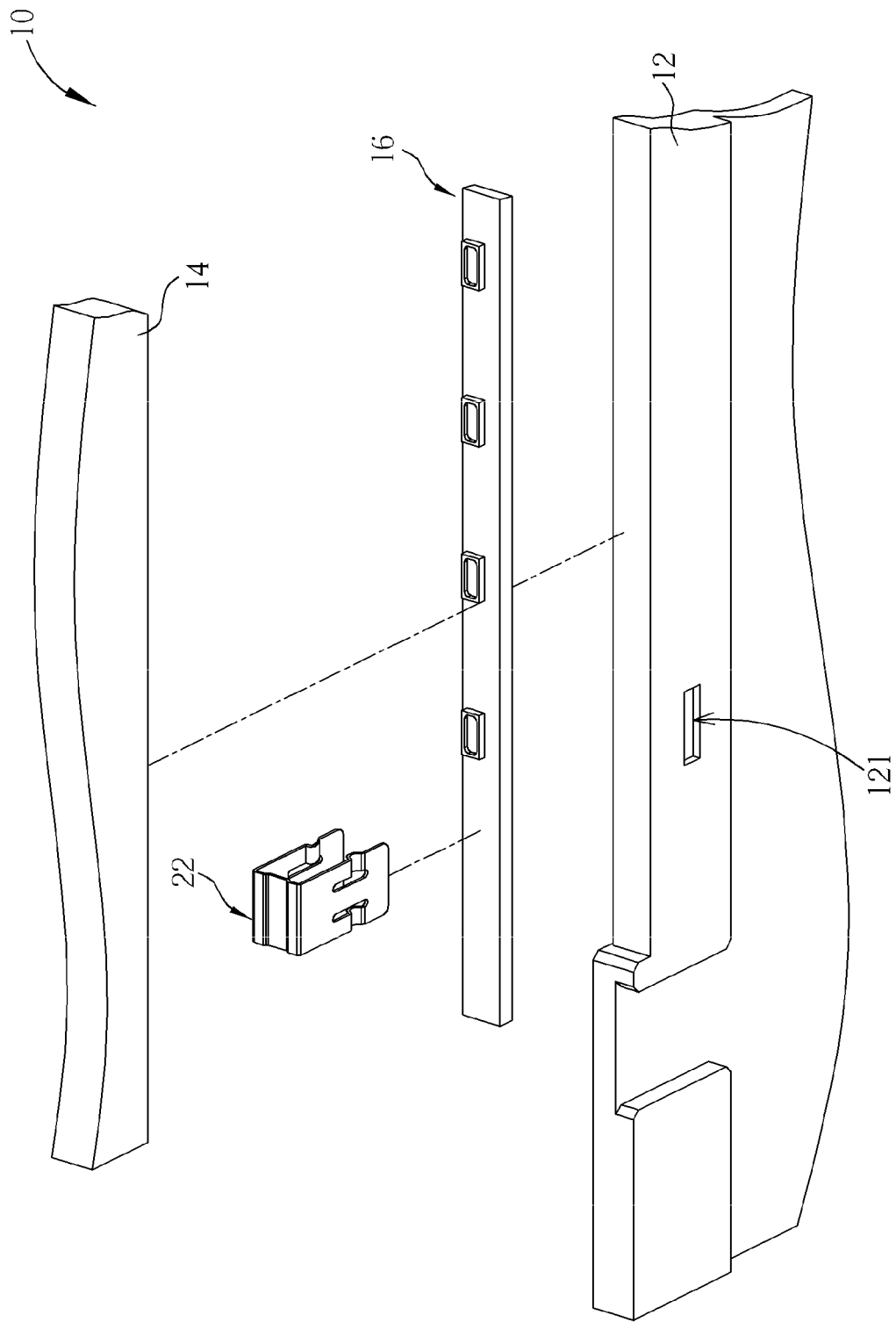
FIG. 1 is an exploded diagram of a backlight module according to an embodiment of the invention.
Figure 2:
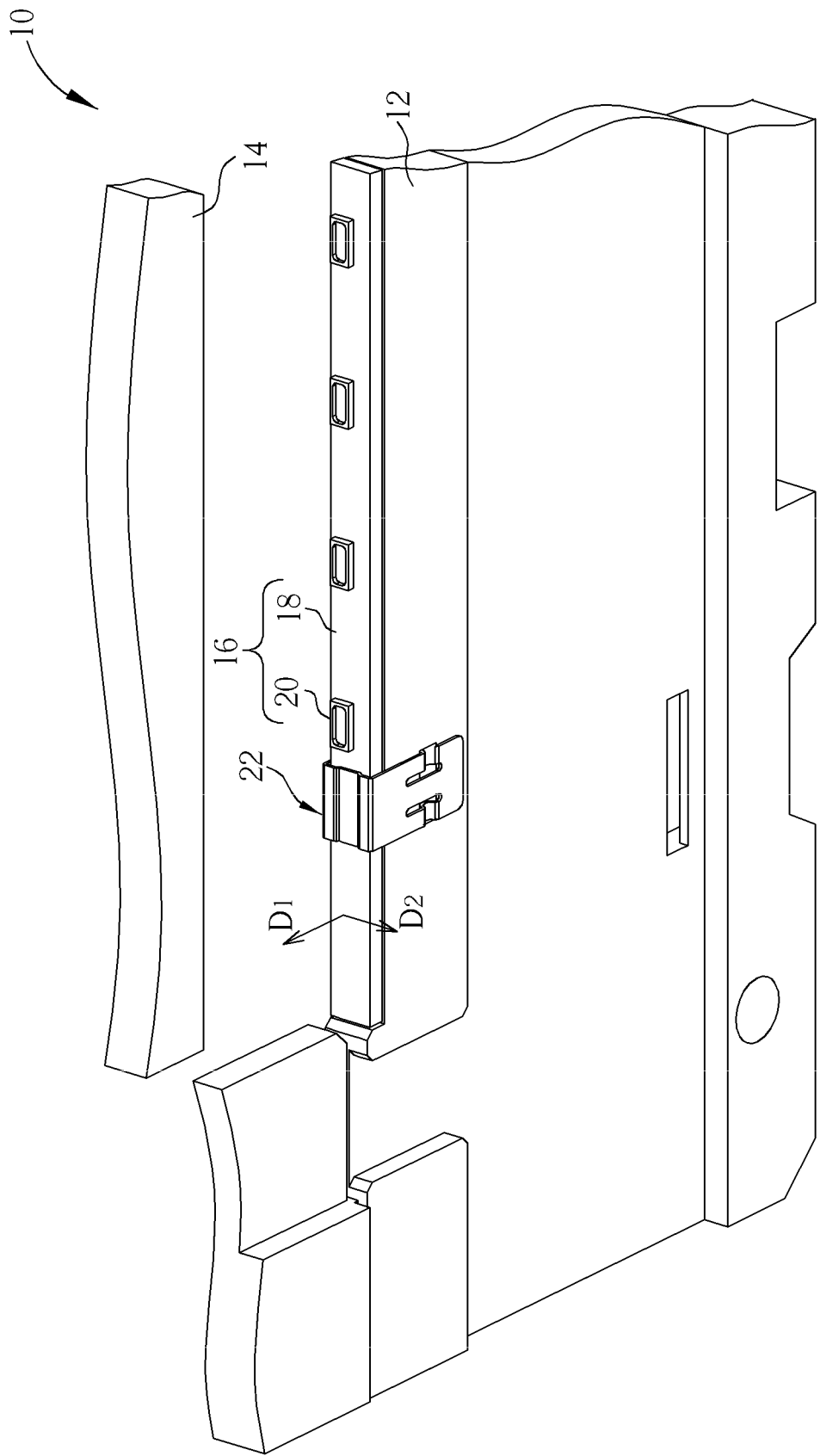
FIG. 2 is an assembly diagram of the backlight module according to an embodiment of the invention.

Please refer to FIG. 1 and FIG. 2. FIG. 1 is an exploded diagram of a backlight module 10 according to an embodiment of the invention. FIG. 2 is an assembly diagram of the backlight module 10 according to an embodiment of the invention. The backlight module 10 includes a base 12, a light guiding plate 14 and a light bar 16. The light guiding plate 14 is disposed nearby the base 12, and the light bar 16 is disposed on the base 12 and on a side of the light guiding plate 14. The light bar 16 includes a printed circuit board (PCB) 18 and at least one light emitting diode (LED) 20. The PCB 18 is disposed on the base 12, and the LED 20 is disposed on the PCB 18. The LED 20 emits light to the light guiding plate 14 according to signals transmitted from the PCB 18. The light guiding plate 14 and the light bar 16 are two separated components, and the backlight module 10 further includes a clamp structure 22 for fixing the PCB 18 of the light bar 16 on the base 12. Generally, the base 12 can be a thermal fin or a back plate of a casing for dissipating heat generated by the backlight module 10, so that the light bar 16 can be clamped on the thermal fin or on the back plate according to structural design.

Figure 3:
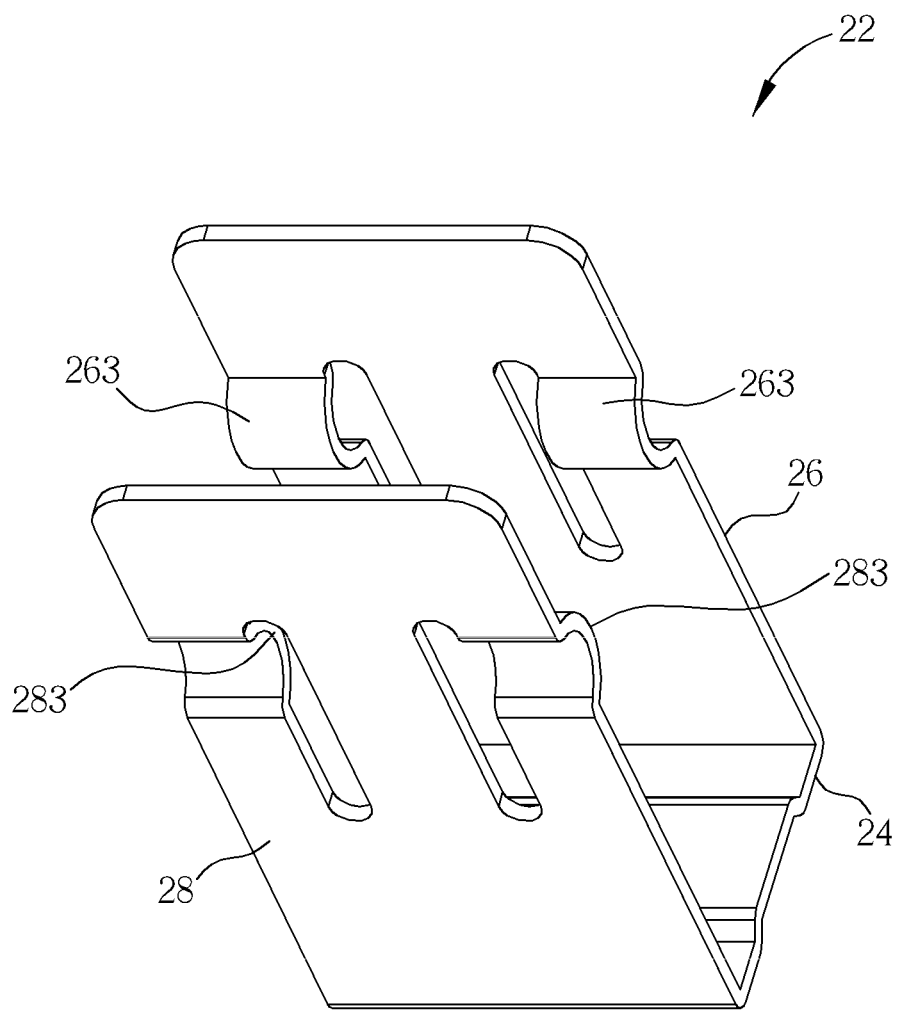
FIG. 3 is a diagram of a clamp structure according to an embodiment of the invention.

Please refer to FIG. 2 and FIG. 3. FIG. 3 is a diagram of the clamp structure 22 according to an embodiment of the invention. For installing the light bar 16 on the base 12 rapidly and conveniently, the clamp structure 22 includes a first board portion 24, a second board portion 26 and a third board portion 28. The second board portion 26 is connected to a lateral side of the first board portion 24 in an elastically deformable manner, and the third board portion 28 is connected to the other lateral side of the first board portion 24 opposite to the second board portion 26 in an elastically deformable manner. As shown in FIG. 3, the first board portion 24, the second board portion 26 and the third board portion 28 can be integrated monolithically for forming a U-shaped structure. A direction of the third board portion 28 relative to a lateral surface of the first board portion 24 is equal to a direction of the second board portion 26 relative to the lateral surface of the first board portion 24, which means the third board portion 28 and the second board portion 26 are disposed on the same lateral surface of the first board portion 24. When the clamp structure 22 clamps the light bar 16 on the base 12, the third board portion 28 and the second board portion 26 press two lateral surfaces of the base 12, and the first board portion 24 contacts against the PCB 18 so as to fix the light bar 16 on the other lateral surface of the base 12. On the other word, the clamp structure 22 utilizes the first board portion 24 to constrain displacement of the PCB 18 relative to the base 12 at a first direction D1, and utilizes the second board portion 26 and the third board portion 28 to constrain displacement of the PCB 18 relative to the base 12 at a second direction D2. The first direction D1 is substantially perpendicular to the second direction D2.

Figure 4:
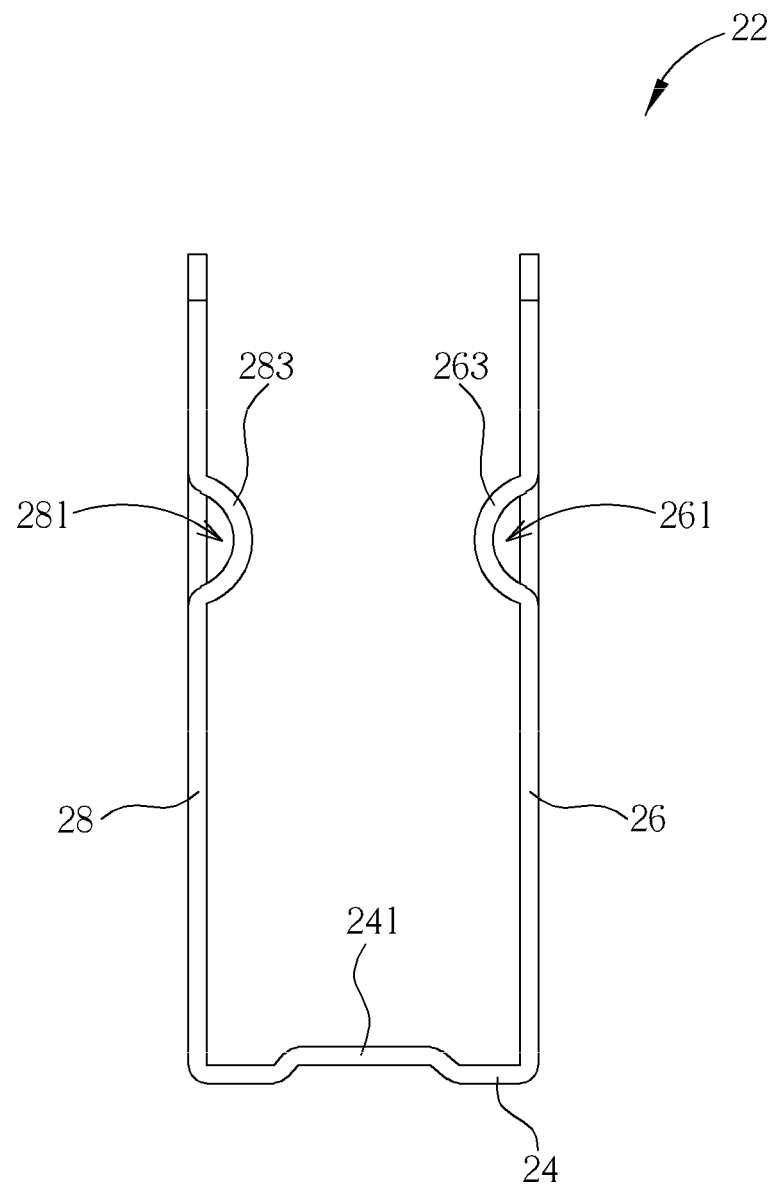
FIG. 4 and FIG. 5 are diagrams of the clamp structure in the other views according to an embodiment of the invention.
Figure 5:
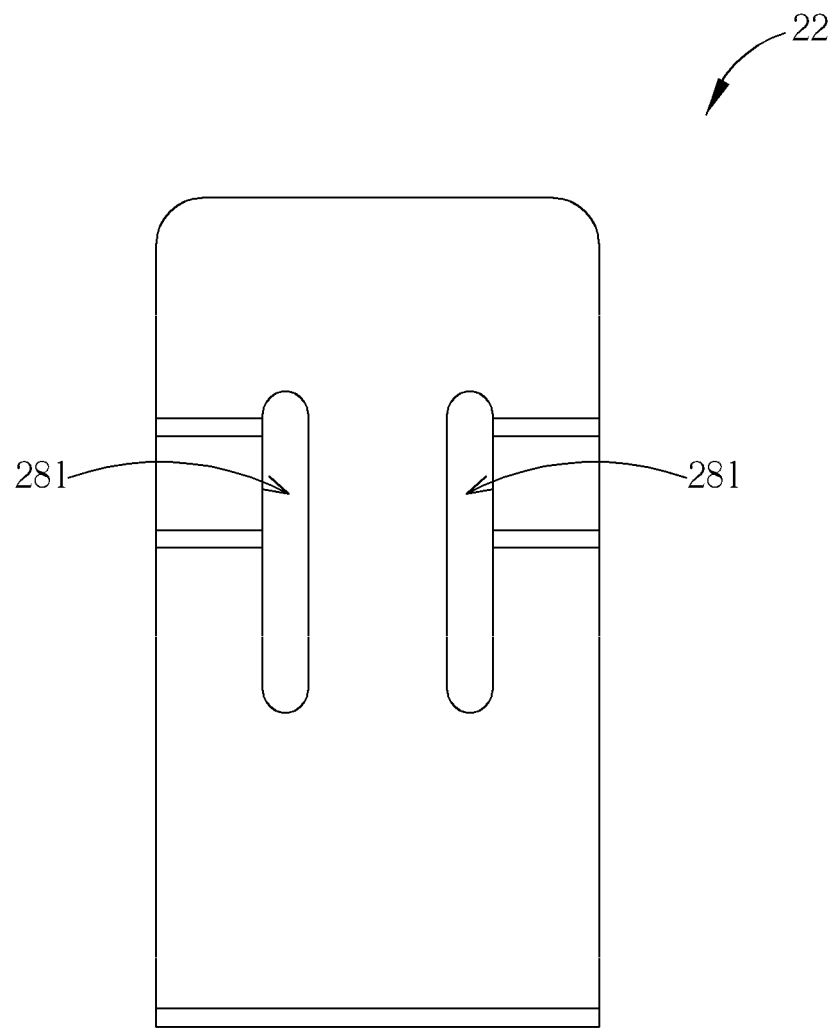

Please refer to FIG. 3 to FIG. 5. FIG. 4 and FIG. 5 are diagrams of the clamp structure 22 in the other views according to an embodiment of the invention. The clamp structure 22 can be made of resilient material. In the embodiment, at least one hole 281 (or a hole 261) can be formed on the third board portion 28 (or the second board portion 26) for decreasing planar rigidity of the third board portion 28 (or the second board portion 26), so as to assemble the clamp structure 22 on the base 12 or to disassemble the clamp structure 22 from the base 12 conveniently. In an embodiment of the invention, the second board portion 26 and the third board portion 28 of the clamp structure 22 respectively have corresponding holes 261, 281. In addition, the first board portion 24 can include a protruding portion 241 for pressing the light bar 16 on the base 12 tightly. The protruding portion 241, the second board portion 26 and the third board portion 28 can be disposed on the same side of the first board portion 24, which means the side adjacent to an inner space of the U-shaped structure, so that the protruding portion 241 can be for pressing the PCB 18 on the other lateral surface of the base 12 tightly.

For fixing the clamp structure 22 on the base 12 stably, a distance between two edges (lateral sides of the second board portion 26 and the third board portion 28 away from the first board portion 24) of the clamp structure 22 (the U-shaped structure) can be substantially less than a thickness of the base 12. When the clamp structure 22 is pushed toward the base 12 at a direction opposite to the first direction D1, the distance between the edges of the clamp structure 22 are expanded by the base 12 in an elastically deformable manner, so that the second board portion 26 and the third board portion 28 of the clamp structure 22 can tightly clamp the base 12 by their resilient recovering force from the resilient material. In addition, a plurality of sunken parts 121 can be formed on a surface of the base 12 (as sown in FIG. 1), and the second board portion 26 and the third board portion 28 can respectively include at least one engaging portions 263, 283. The engaging portions 263, 283 are respectively disposed on a surface of the second board portion 26 and a surface of the third board portion 26 facing to the second board portion 26 (which means inner surfaces of the U-shaped structure). When the clamp structure 22 clamps the base 12 at a predetermined position, the protruding portion 241 of the first board portion 24 presses on the PCB 18 tightly and the engaging portions 263, 283 can be engaged inside the corresponding sunken parts 121 accurately. Therefore, the engaging portions and the protruding portion are for constraining the displacement of the clamp structure 22 relative to the base 12, so as to enhance clamping strength of the clamp structure 22. In an embodiment of the invention, the clamp structure 22 includes four engaging portions and the corresponding sunken parts. Amounts and disposal of the engaging portions and the sunken parts are not limited to the above-mentioned embodiment, and it depends on actual demand.

Furthermore, the clamp structure 22 fits the PCB 18 and the base 12 tightly, and the clamp structure 22 (including the first board portion 24, the second board portion 26 and the third board portion 28) can be made of conductive material, so as to ground and to prevent the backlight module 10 from electromagnetic interference (EMI) when the clamp structure 22 fixes the light bar 16 on the base 12. If the base 12 is a heat-dissipating component (such as the thermal fin or the thermal block) or a back plate made of heat conductive material, the clamp structure 22 (including the first board portion 24, the second board portion 26 and the third board portion 28) can dissipate the heat generated by the light bar 16 with the base 12 for increasing an emitting efficiency of the LED 20 when the clamp structure 22 clamps the light bar 16 on the base 12.

Comparing with the prior art, the clamp structure of the invention is a U-shaped structure, and utilizes the first board portion, the second board portion and the third board portion to constrain the vertical displacement and the horizontal displacement of the light bar relative to the base. The clamp structure of the invention can be made of the resilient material, so that the clamp structure can be pushed to assemble on the light bar and be pulled to disassemble from the light bar easily and conveniently. The invention has advantages of convenient assembly and easy operation, and the base is not damaged by the clamp structure when the clamp structure clamps the base, so as to increase rework quality of the backlight module. In addition, the clamp structure can fix the light bar on the base of the backlight module having different dimensions, so that the prevent invention has great market competitiveness.

Those skilled in the art will readily observe that numerous modifications and alterations of the device and method may be made while retaining the teachings of the invention.

What is claimed is:

1. A clamp structure comprising:
a first board portion;
a second board portion connected to a lateral side of the first board portion in an elastically deformable manner; and
a third board portion connected to the other lateral side of the first board portion opposite to the second board portion in an elastically deformable manner, the third board portion and the second board portion being disposed on the same side of the first board portion for clamping two surfaces of a base, and the first board portion contacting against a light bar with a plurality of light sources for fixing the light bar directly on an edge surface between the two surfaces of the base.

2. The clamp structure of claim 1, wherein at least one hole is formed on the third board portion for decreasing planar rigidity of the third board portion.

3. The clamp structure of claim 1, wherein the first board portion comprises a protruding portion for pressing the light bar on the other surface of the base, and the protruding portion, the second board portion and the third board portion are disposed on the same side of the first board portion.

4. The clamp structure of claim 1, wherein the third board portion comprises at least one engaging portion disposed on a side of the third board portion facing to the second board portion for engaging inside a sunken part on the base.

5. The clamp structure of claim 4, wherein the second board portion comprises at least one engaging portion disposed on a side of the second board portion facing to the third board portion for engaging inside the other sunken part on the base.

6. The clamp structure of claim 1, wherein the first board portion, the second board portion and the third board portion are made of conductive material for grounding.

7. The clamp structure of claim 1, wherein the base is a heat dissipating block or a frame made of heat conducting material, and the first board portion, the second board portion and the third board portion are made of heat conducting material for dissipating heat generated by the light bar.

* * * * *